(12) United States Patent
Pogmore

(10) Patent No.: US 8,862,897 B2
(45) Date of Patent: Oct. 14, 2014

(54) INCREASING DATA SECURITY IN ENTERPRISE APPLICATIONS BY USING FORMATTING, CHECKSUMS, AND ENCRYPTION TO DETECT TAMPERING OF A DATA BUFFER

(75) Inventor: George R. Pogmore, Greenwood Village, CO (US)

(73) Assignee: Oracle International Corporation, Redwood Shores, CA (US)

(*) Notice: Subject to any disclaimer, the term of this patent is extended or adjusted under 35 U.S.C. 154(b) by 331 days.

(21) Appl. No.: 13/459,744

(22) Filed: Apr. 30, 2012

(65) Prior Publication Data

US 2013/0086392 A1 Apr. 4, 2013

Related U.S. Application Data

(60) Provisional application No. 61/542,181, filed on Oct. 1, 2011.

(51) Int. Cl.
*H04L 29/00* (2006.01)
*G06F 17/30* (2006.01)

(52) U.S. Cl.
CPC .................. *G06F 17/30911* (2013.01)
USPC .......................................... 713/189

(58) Field of Classification Search
CPC .................................. G06F 17/30911
USPC .......................................... 713/189
See application file for complete search history.

(56) References Cited

U.S. PATENT DOCUMENTS

| 4,864,615 A | 9/1989 | Bennett et al. |
| 5,225,833 A | 7/1993 | Fisher et al. |
| 5,696,504 A | 12/1997 | Oliveros |
| 5,742,686 A | 4/1998 | Finley |
| 6,717,580 B1 | 4/2004 | Tang |
| 6,744,761 B1 | 6/2004 | Neumann et al. |
| 2003/0210787 A1 | 11/2003 | Billhartz et al. |
| 2006/0092867 A1 | 5/2006 | Muller et al. |
| 2007/0204290 A1 | 8/2007 | Li |
| 2009/0052661 A1 | 2/2009 | Fahrny et al. |
| 2010/0142710 A1 | 6/2010 | Chrysler et al. |
| 2012/0230225 A1 | 9/2012 | Matthews et al. |
| 2013/0086127 A1 | 4/2013 | Pogmore |
| 2013/0086392 A1 | 4/2013 | Pogmore |
| 2013/0086393 A1 | 4/2013 | Pogmore |

OTHER PUBLICATIONS

Final Office Action dated Nov. 8, 2013 for U.S. Appl. No. 13/459,829.
Non-final Office Action dated Jul. 26, 2013 for U.S. Appl. No. 13/459,829.
Advisory Action dated Jan. 14, 2014 for U.S. Appl. No. 13/459,829.
Non-final Office Action dated Feb. 28, 2014 for U.S. Appl. No. 13/459,829.
Notice of Allowance and Fees Due dated Jul. 8, 2014, for U.S. Appl. No. 13/459,829.

*Primary Examiner* — Jeffrey Pwu
*Assistant Examiner* — Michael D Anderson
(74) *Attorney, Agent, or Firm* — Vista IP Law Group, LLP

(57) ABSTRACT

A method, system, and computer program product for using hidden buffer formatting and passing obfuscated encryption key values to detect tampering with and/or prevent unauthorized inspection of a data buffer. The method comprises receiving an unencrypted sequence to be encrypted, selecting a layout version to associate to an encryption method and a checksum method, then encrypting the unencrypted sequence using the encryption method to form an encrypted sequence, and calculating, using the checksum calculation method, an unencrypted sequence checksum. Further, storing the encrypted sequence to form a hidden buffer payload, which hidden buffer has its own hidden buffer payload checksum. Encryption keys are not stored in program data, nor sent in the hidden buffers. Instead obfuscated encryption key values are used to generate keys on the fly. The receiver of a hidden buffer and obfuscated encryption key values can detect tampering or data corruption of the payload for further processing.

22 Claims, 14 Drawing Sheets

Comparison of binary-to-text and text-to-binary conversion times

| conversions, text to binary | Elapsed time, release build (sec) | Ratio to AP hex | Quantify time, release build (millisec) | Ratio to AP hex | Elapsed time, debug build (sec) | Ratio to AP hex | Quantify time, debug build (millisec) | Ratio to AP hex |
|---|---|---|---|---|---|---|---|---|
| strtol (strtol) | 52,793 | 43.9 | 8514.5 | 132.6 | 53,063 | 21.0 | 1003.9 | 125.1 |
| sscanf (sscanf_s) | 116,820 | 97.1 | 39440.0 | 613.7 | 373,750 | 135.9 | 20921.0 | 4008.5 |
| optimized function | 12,031 | 10.0 | 23.6 | 3.8 | 11,972 | 4.2 | 55.5 | 6.9 |
| AP hex | 1,204 | 1.0 | 64.2 | 1.0 | 2,750 | 1.0 | 80.2 | 1.0 |
| conversions, binary to text | | | | | | | | |
| itoa (_itoa_s) | 36,662 | 26.4 | 7551.9 | 78.4 | 89,484 | 18.8 | 980.2 | 77.8 |
| sprintf (sprintf) | 223,280 | 161.2 | 58944.0 | 612.1 | 369,530 | 77.8 | 76218.0 | 609.2 |
| optimized function | 3,352 | 2.4 | 172.4 | 1.8 | 10,094 | 2.4 | 485.3 | 3.9 |
| AP hex | 1,398 | 1.0 | 96.3 | 1.0 | 4,219 | 1.0 | 123.4 | 1.0 |

| Notes: | (1) conversions were done on Windows system using vector_1 characters | (2) standard functions used were the wide equivalents: strtol (wcstol_s), sscanf (_itow_s), and sprintf (_itow_s) | (3) strtol and itoa are commonly used for binary-hex conversions | (4) sscanf and sprintf are sometimes used for binary-hex conversions |
|---|---|---|---|---|
| | (5) optimized functions were for standard hex representation | (6) AP hex conversions used one code line for text-to-binary, and two code lines for binary-to-text | (7) Elapsed time results include loop counters, for 10,000,000 repetitions | (8) IBM Rational Quantify results do not include loop counters (only actual conversion code), for 1,000,000 repetitions |

FIG. 2B

INCREASING DATA SECURITY IN ENTERPRISE APPLICATIONS BY USING FORMATTING, CHECKSUMS, AND ENCRYPTION TO DETECT TAMPERING OF A DATA BUFFER

RELATED APPLICATIONS

The present application claims the benefit of priority to U.S. Provisional Patent Application Ser. No. 61/542,181, entitled "DATA STRUCTURE REPRESENTATION, MEANING AND PASSING", filed on Oct. 1, 2011, which is hereby incorporated by reference in its entirety, and the present application is related to co-pending U.S. patent application Ser. No. 13/459,829, entitled "INCREASING DATA SECURITY IN ENTERPRISE APPLICATIONS BY OBFUSCATING ENCRYPTION KEYS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of enterprise software applications and more particularly to techniques for increasing data security in enterprise applications.

BACKGROUND

Some embodiments of the present disclosure are directed to an improved approach for implementing increasing authentication and data security in enterprise applications. More particularly, disclosed herein are techniques for using formatting, checksums, and encryption to detect tampering of a data buffer, and techniques for obfuscating encryption keys.

In the context of enterprise software applications, when a value needs to be stored and/or passed around (e.g., a value being a buffer, a string, an XML data structure, etc.), legacy formatting and data passing techniques allow the stored and/or passed-around data to be read by users. In some cases the stored and/or passed-around data was encrypted, and encryption keys held as "secret" so users or malicious agents were unaware of the actual, unencrypted content being passed around (and also unaware of the actual value of the secret keys). In some cases, encrypted data was then often turned into a text string by using (for example) base-64 encoding.

However, some legacy systems employ legacy techniques that pass around data in buffers that could be tampered with, and those legacy techniques were unable to detect such tampering. Even when the techniques included encryption, legacy systems involving enterprise applications distributed as enterprise software programs have relied on keys being stored in the code base of the software programs. Such keys, being stored in the code base of the software programs, could conceivably be hacked by a malicious agent, and the malicious agent could gain access to the cryptographic key and potentially use the data in the buffers for malicious purposes.

Accordingly, advances of techniques to format data into a buffer so as to facilitate detection of data tampering, and advances in techniques to obfuscate keys so as to prevent such tampering, are needed. Further, some legacy enterprise software applications would use standard hexadecimal representations when transforming binary sequences into "HEX" characters (e.g., HEX characters represented with characters 0 to 9 and A to F). However, especially for large payloads, the legacy techniques consumed too many computing cycles for each character converted. Moreover, the aforementioned technologies do not have the capabilities to achieve perform high-performance formatting and checksums to detect tampering of a data buffer.

Therefore, there is a need for improved approaches for implementing data security in enterprise applications.

SUMMARY

The present disclosure provides an improved method, system, and computer program product suited to address the aforementioned issues with legacy approaches. More specifically, the present disclosure provides a detailed description of techniques used in methods, systems, and computer program products for increasing authentication and data security in enterprise applications.

Disclosed herein are methods, systems, and computer program products for using hidden buffer formatting and passing obfuscated encryption key values to detect tampering with and/or prevent unauthorized inspection of a data buffer. The method comprises receiving an unencrypted sequence to be encrypted, selecting a layout version to associate to a layout arrangement, an encryption method and a checksum method, then encrypting the unencrypted sequence using the encryption method to form an encrypted sequence, then calculating an unencrypted sequence checksum using the checksum calculation method associated with the layout version. Further, storing the encrypted sequence to form a hidden buffer payload, which hidden buffer has its own payload checksum. Encryption keys are not stored in program data, nor sent in the hidden buffers. Instead obfuscated encryption key values are used to generate keys on the fly. The receiver of a hidden buffer and the obfuscated encryption key values can detect tampering or data corruption of the payload and initiate tamper processing steps.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 2B are runtime performance comparisons for methods of encoding and decoding binary buffers into a text representation, according to some embodiments.

DETAILED DESCRIPTION

Figure 1A:
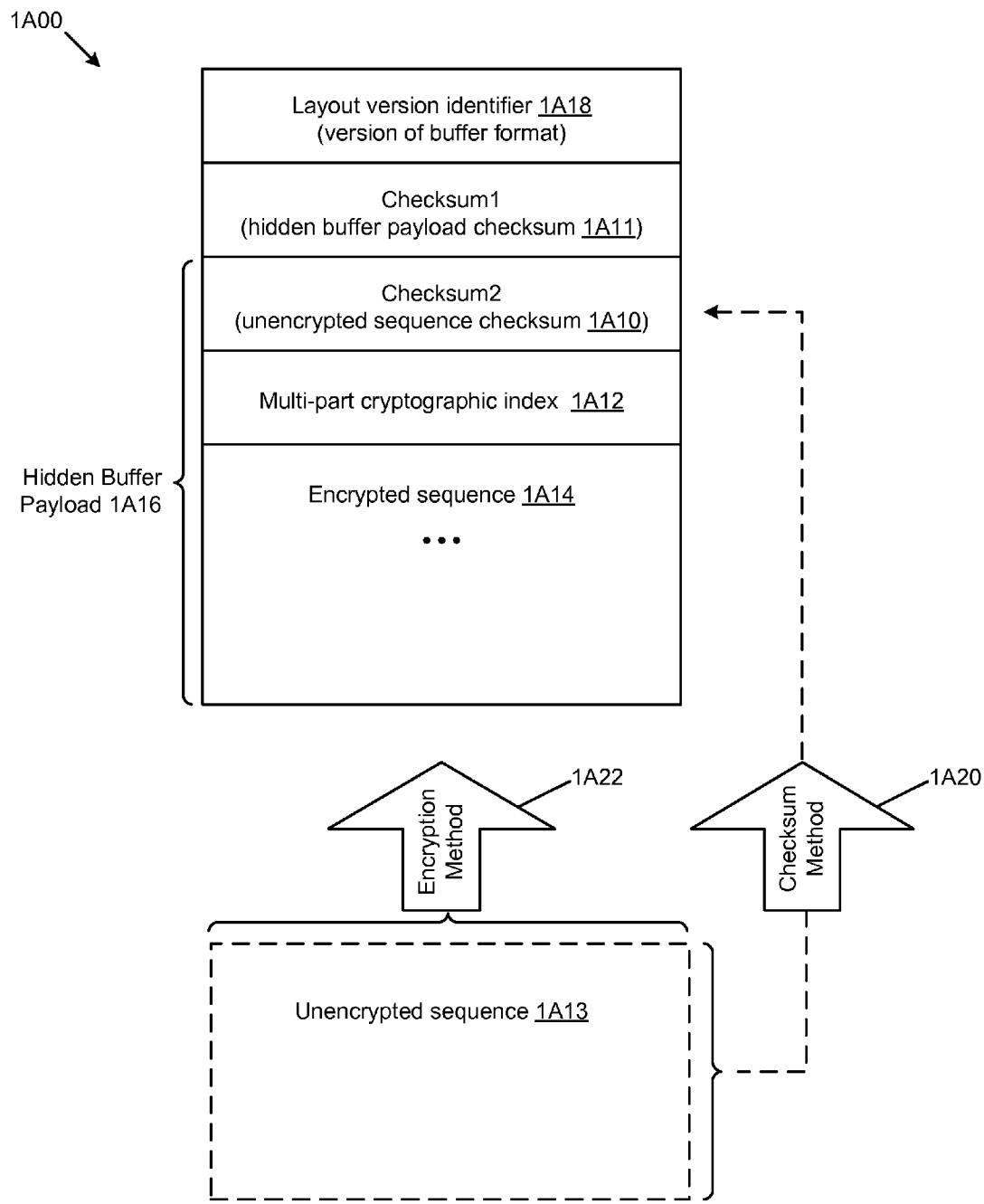
FIG. 1A is a diagram of a data structure layout for using formatting, checksums, and encryption to detect tampering of a data buffer, according to some embodiments.

Some embodiments of the present disclosure are directed to environments, methods, and systems for implementing increased authentication and data security in enterprise applications. More particularly, disclosed herein are improved approaches for using formatting, checksums, and encryption to detect tampering of a data buffer.

Overview

Enterprise applications deal with data (e.g., data related to commercial transactions) and such data needs to be secure, even after being transmitted and re-transmitted through public networks. Moreover, certain commercial transactions are subject to various regulatory controls. For example, in some countries, commercial transactions are monitored by governmental authorities, and the transactions must be certified. Specific certification requirements may be specified by the governmental authorities (e.g., a tax agency), and in some cases the data elements pertaining to commercial transactions (e.g., invoices) must be digitally signed to prevent tampering. For example, electronic signatures might be required, and might further be required to use RSA private keys (comprising keys that are hidden or otherwise obfuscated from unauthorized or malicious agents) in combination with RSA public keys. In the foregoing example, the associated RSA public key must be sent to a tax agency, and invoices or other commercial documents are to be put in an XML file format and marked with sequential signatures. Any entities subject to such regulations are compelled to send the aforementioned XML files to the tax agency. The applicable enterprise applications include software programs to implement machine-aided enforcement of the regulations, which enforcement serves to meet the certification levels required. Further, various enterprise software programs provide tools for generating digital signatures, and for generating RSA public/private key pairs.

One possible implementation within an enterprise application includes a function (e.g., a subroutine) for signing of invoices by a particular business group (e.g., accounts receivable department). Strictly as an example, a function might be defined as:
AuthSign(AuthInit, SignInit, ItemToSign, Signature),
where
AuthInit—Input—string containing authorization.
SignInit—Input—string containing encrypted private key.
ItemToSign—Input—item to be digitally signed.
Signature—Output—base-64 encoded signature by the signing entity.

Continuing this example, one embodiment would create three files:
A file for holding a generated public key.
A header file with a text string used to generated a private key that is associated with the aforementioned public key.
A header file with a text string to hold authorization for the entity that will do the signing.

The generated private key can be stored in a 'hidden buffer' (further described below), or indexes to obfuscated keys can be stored in a hidden buffer. The authorization string is can also stored in a hidden buffer. Following the herein-disclosed techniques, the hidden buffers can be openly used in business transactions (e.g., transmitted over public networks). In a text representation (e.g., hex characters as further discussed below), a hidden buffer appears as a random-looking text string. Hidden buffers can be implemented as byte arrays, and can be encrypted (e.g., using AES) and then encoded into a text string composed of readable/printable characters (e.g., see APHEX, below). And, the cryptographic keys are obfuscated using indexes rather than actual key values, thus raising the level of security.

In exemplary embodiments, AES cryptographic keys can be used, although other encryption techniques are reasonable and envisioned. AES encryption uses a key value and an initial value. Some embodiments use a single byte to select from 256 key values and initial value combinations. For example, the upper half of the single byte is used as an index for the key value, and the lower half of the single byte is used as an index for the initial value. The actual AES key and initial value values are generated using the results of an XOR operation being applied to a byte array such as the aforementioned hidden buffer byte array. Using the technique of storing only the index (e.g., index to a key, index to an initial value) has the effect that the stored arrays are more secure than techniques that store the actual key and store initial actual value values in the program code. In operation, the values of the actual AES key and the actual initial value only exist while actually being used for encryption/decryption operations.

DESCRIPTIONS OF EXEMPLARY EMBODIMENTS

Hidden Buffers

FIG. 1A is a diagram of a data structure layout 1A00 for using formatting, checksums, and encryption to detect tampering of a data buffer. As an option, the present data structure layout 1A00 may be implemented in the context of the architecture and functionality of the embodiments described herein. Also, the data structure layout 1A00 used in a system or any aspect therein may be implemented in any desired environment.

As indicated above, a public key can be generated and stored in a file. As given below, the key can be encoded into printable characters (e.g., ASCII characters) and stored in a nonvolatile media for later use. Below is a public key, strictly as an example.

```
-----BEGIN PUBLIC KEY-----
MIGfMA0GCSqGSIb3DQEBAQUAA4GNADCBiQKBgQDQ7VGD00Q1HSsLGOcarNHGBr1a
hFrXFPF1Dz3TixEXvs4iusrL7jAGRGhmGy8+ZOvMETDaHEcNSoBPP0+oHgiXAZ9x
naE+fR56ok7Sxy2r8xmkHO1NBcDRkBXHhnqHZE1xCxLG7EFFQsQwe6Zm2GNr8FCL
-----END PUBLIC KEY-----
```

Also as indicated above, strings for authentication (e.g., for signing by an authorized user, and/or for authentication by an authorized user) can be stored in strings. As shown below, such strings can be coded into program code, and yet a malicious user cannot use the authentication strings directly.

```
/* string for signing initialization (base array) */
JCHAR *SignInit[ ] = {
_J("ABMCOGGNDPKJNPBNCENLHKFOODFPOMMNAGABNLFMOKNAKDCMBNFEMECFBLF"),
_J("KHHEFHLNJHEHMIFJGKFJCDEFIOCLMJCFOCFHPGKBAIOCGLOAPKODIJDIEPM"),
_J("ECCNBKBKDMEBMDEDNDFBPJMOMEJPKEBKNIJNKFGNIKKIKJHDMIBLJJGINAP"),
_J("")};
/* string for authorization */
JCHAR *AuthInit[ ] = {
_J("ABJJCPDFMHNDMCNHJEHHBMNJEMLKHAFDBFHNBFOIHBDMDLDJIAHKGAFFBAC"),
_J("PCIJJOFHFLPGONPI"),
_J("")};
```

FIG. 1A illustrates a data structure layout 1A00 of hidden buffer data structures, according to some embodiments. Aspects of FIG. 1A can be used in the context of the embodiments disclosed herein, and/or can be used in any other context. Shown is one possible data structure layout of a hidden buffer. Other data structure layouts are possible and envisioned without departing from the claimed scope.

Given the existence of a byte array comprising a sequence (e.g., an unencrypted sequence) to be securely transmitted (and later authenticated) and the aforementioned indexes, a hidden buffer payload can be formed as follows:

The aforementioned indexes are formatted to form a multi-part cryptographic index 1A12;

The unencrypted sequence 1A13 is encrypted to form an encrypted sequence 1A14;

The unencrypted sequence 1A13 is subjected to a checksum calculation to form an unencrypted sequence checksum 1A10;

The encrypted sequence 1A14 and the multi-part cryptographic index 1A12 and the unencrypted sequence checksum 1A10 are combined to form a hidden buffer payload 1A16.

The data structure layout 1A00 is merely an exemplary layout. The unencrypted sequence 1A13 can be any sequence of data (e.g., a sequence of bits, a sequence of bytes, a sequence of binary data, a sequence of character data, a sequence of encoded data, etc.). As is described herein, one embodiment includes a given sequence of data comprising binary values that can be encoded into text strings (e.g., encoded using the herein-described APHEX or other text strings). Also included in the data structure layout 1A00 are:

A layout version identifier 1A18, which value indicates the buffer layout pattern and encryption method; and A hidden buffer payload checksum 1A11.

The layout version identifier 1A18 comprises a numeric value or other value to uniquely identify a particular data structure layout version. As can be recognized, the bit width of the layout can vary, and the order of constituents of the payload or layout can vary. For example, the layout of the hidden buffer payload 1A16 can be arranged as shown, having a Checksum2 followed by a multi-part cryptographic index, followed by an encrypted sequence. Or the layout of the hidden buffer payload 1A16 can be arranged as having a multi-part cryptographic index, followed by an encrypted sequence, followed by a Checksum2. The layout version identifier identifies the layout arrangement of the hidden buffer payload. Moreover, a multi-part cryptographic index 1A12 can be formatted as a single byte, or can be formatted as a word of any length. And a multi-part cryptographic index 1A12 can comprise a first portion to hold an index into a first array, and a second portion to hold an index into a second array. Or, a multi-part cryptographic index 1A12 can comprise any arbitrary assembly pattern as may be applicable to a particular encryption method. As a specific alternative layout example, the data item labeled as Checksum1 is a checksum of the portion of the layout labeled as the hidden buffer payload 1A16. The Checksum1 can be represented as a single-byte or a multi-byte-wide checksum, or it can be of a different length (e.g., 16 bits, 32 bits, etc.).

The herein disclosed embodiments of the data structure layout 1A00 distinguish over legacy enterprise application layouts at least because the data structure layout 1A00 contains a plurality of checksum values. The checksums prevent the text string from being undetectably modified. Whether modified intentionally or accidentally, the decryption processes described herein will detect tampering if the checksums are not deemed to be correct.

Of course enterprise applications often process a high volume of sensitive and/or authenticated data related to commercial transactions. Accordingly, a high-performance, checksum function is used to calculate checksum values (e.g., Checksum1, Checksum2). The checksum method 1A20 can perform calculations using a byte-by-byte checksum calculation, or can perform calculations using multi-byte calculations.

As earlier mentioned, one checksum, namely the unencrypted sequence checksum 1A10 is used for the unencrypted buffer. One purpose of this unencrypted sequence checksum 1A10 is to ensure that the decrypted value matches the original binary buffer. The hidden buffer payload checksum 1A11 is for the hidden buffer payload 1A16 (comprised of the Checksum2 value, the multi-part cryptographic index 1A12, and the encrypted sequence 1A14). One purpose of this hidden buffer payload checksum 1A11 is to confirm that buffer was received in an uncorrupted state, and to perform such a confirmation even before a decryption process begins. Using such a data structure layout prevents hackers from modifying the key index or encrypted buffer to try to reverse-engineer the key values or buffer values. Any modification (malicious or otherwise) of any part of the hidden buffer payload 1A16 would demand that the checksum values also be modified appropriately. Otherwise, the modified hidden buffer payload would be detected as invalid.

In exemplary embodiments, the encryption/decryption is performed using an industry-standard implementation of an encryption method 1A22 such as AES. In this case, an AES key index is stored in as the multi-part cryptographic index 1A12, and is represented as a single byte, thus representing values in the range of 0 to 255. This allows a particular unencrypted sequence 1A13 to be encrypted and stored as any one of 256 different variations by varying the key index. Exemplary variations encrypt an encoded sequence, and store an encrypted sequence 1A14 in the form of text strings. In this example, the upper half of the key byte represents the index (of numeric values 0 to 15) of an AES key value, and the lower half of key byte represents the index (of numeric values 0 to 15) of the AES initial value. The actual AES key and its values are generated at runtime, within the decryption program, using the AES key index stored in the buffer.

Such embodiments can be used to store an RSA private key for digital signing, and can be used to store the authorization to do digital signing. One feature of a hidden buffer transmitted as a hidden buffer payload 1A16 as compared to legacy encrypted buffers is that the encryption keys are more secure since they are passed as indexes to encryption values rather than passed as the encryption values themselves. Another aspect is that hackers cannot try to guess key values unless they also know the checksum algorithm. The layout and technique of FIG. 1A can be used in any environment, including in environments where:

The encoding of an unencrypted sequence is performed using the APHEX algorithm as is described below.
The encryption is performed using an encryption technique other than AES.
The checksum calculations are performed using the high-performance checksum algorithm as is described below.

Checksum Calculations

In some of the embodiments described above, the checksum calculation returns a two-byte value as determined by processing a given byte array (e.g., an unencrypted sequence 1A13). Such a checksum value serves to verify that a given byte array matches an original byte array. Discrepancies could result from malicious tampering, or from any other modification for that matter.

Legacy hashing algorithms do not produce desired distributions, and advances in algorithms that produce desired distributions as well as require many fewer calculations are herein described. Specifically, one possible hashing algorithm for use in embodiments of a data structure layout 1A00 comprise a program sequence such as:

```
Set a checksum (e.g., two-bytes) to an initial value of 0x729A
For each two bytes of a byte array
    {
    checksum = checksum + byte1 (lower byte) and byte2 (upper byte)
    checksum = checksum + left shift of checksum by 8 bits
    checksum = checksum + left shift of checksum by 5 bits
    checksum = checksum + left shift of checksum by 4 bits
    checksum = checksum + left shift of checksum by 5 bits
    checksum = checksum + left shift of checksum by 7 bits
    }
```

Following the techniques herein described, a sender can send a data buffer with a hidden buffer payload, and a receiver can confirm that the hidden buffer payload was received in an un-tampered state. One such confirmation technique is as follows:

A receiver computer receives a data buffer comprising a layout version identifier;
The receiver uses the layout version identifier to associate a decryption method and a checksum method;
The receiver decrypts the hidden buffer payload portion of the data buffer using the decryption method to form an unencrypted sequence together with the received unencrypted sequence checksum, and calculates a calculated unencrypted sequence checksum (the calculated unencrypted sequence checksum for use in matching, see below); and
The receiver compares the calculated unencrypted sequence checksum to the received unencrypted sequence checksum to determine a match value. If the match fails, then the receiver can initiate tamper processing.

Figure 1B:
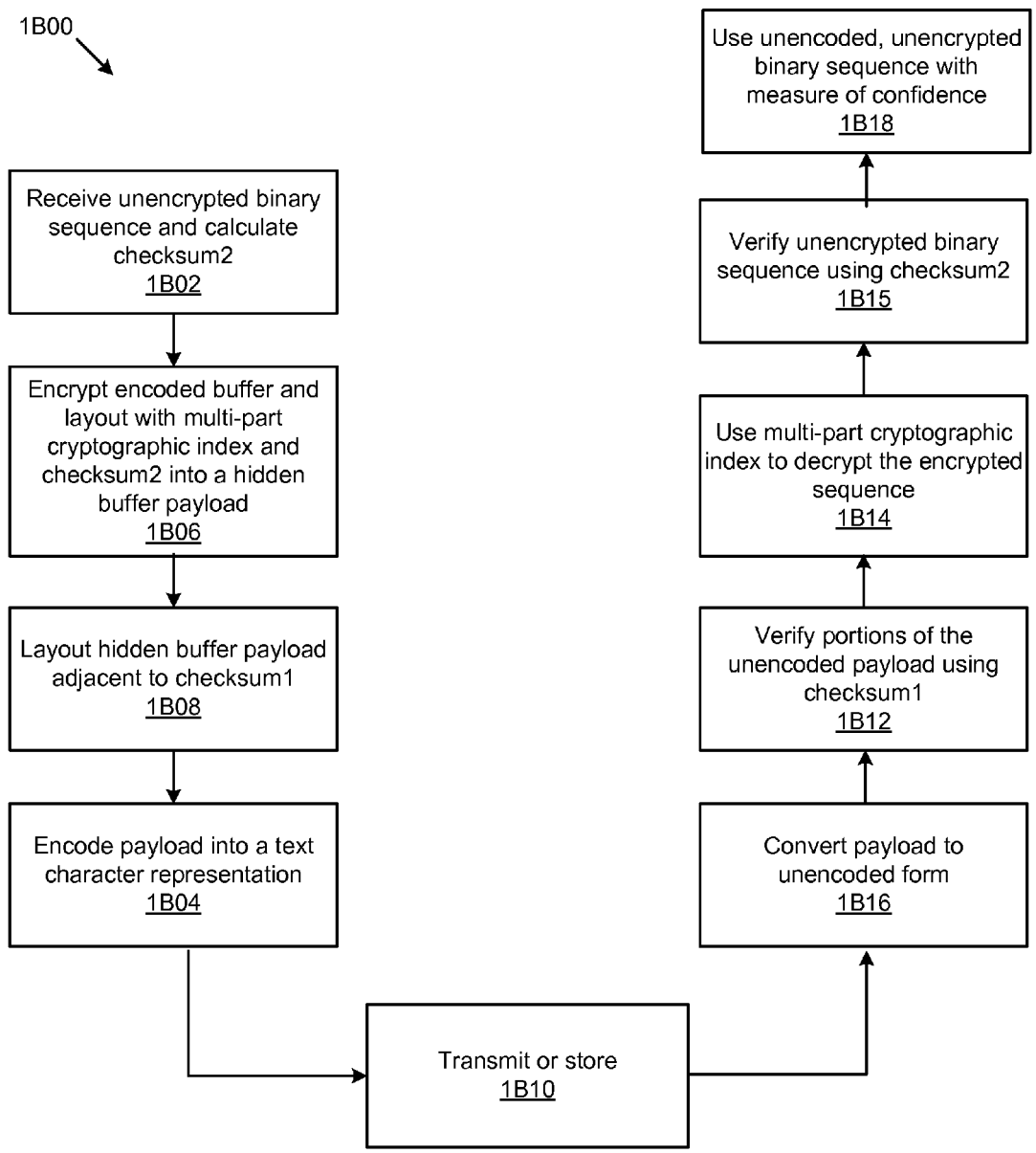
FIG. 1B is a flow chart for using formatting, checksums, and encryption to detect tampering of a data buffer, according to some embodiments.

FIG. 1B is a flow chart 1B00 for using formatting, checksums, and encryption to detect tampering of a data buffer. As an option, the present flow chart 1B00 may be implemented in the context of the architecture and functionality of the embodiments described herein. Also, the flow chart 1B00 showing a processing technique used in systems disclosed herein, or any aspect the flow chart 1B00 may be implemented in any desired environment.

Strictly as an option, the system of flow chart 1B00 commences by receiving a given unencrypted buffer (e.g., unencrypted binary buffer) for processing (see operation 1B02). Now, using an index (e.g., the multi-part cryptographic index 1A12), operation 1B06 serves to encrypt the encoded buffer and to layout the constituents into a portion of memory (e.g., a contiguous range of memory addresses) in the form of a hidden buffer payload 1A16.

The operation 1B08 serves to store the hidden buffer payload adjacent to Checksum1 within the data structure layout. Another step proceeds to encode the received instance of the unencrypted buffer into a text character representation (see operation 1B04). The data structure layout is populated by the foregoing operations and is then transmitted or stored (see operation 1B10).

In some cases, additional data items (e.g., a layout version identifier 1A18, a hidden buffer payload checksum 1A11, etc.) are pre-appended (or appended) to the hidden buffer payload 1A16 before the data structure layout is transmitted or stored.

Upon successful transmission or retrieval of a stored layout of data, program code or other implementation of operation the payload can now be unencoded (see operation 1B16) using a reversible encoding process (e.g., which process can be determined by parsing the layout version identifier 1A18), thus resulting in the unencrypted sequence 1A13 as originally received.

The operation 1B12 can verify checksum1 to confirm that the hidden buffer payload 1A16 has not been modified and is in a state for decryption. The index (e.g., the multi-part cryptographic index 1Al2) is used to index into arrays for retrieval of decryption values, and then the encrypted sequence is decrypted (see operation 1B14). The operation 1B15 serves to verify unencrypted binary sequence using checksum2, and the unencrypted sequence 1A13 as originally sent (see operation 1B02) can be used with a measure of confidence (see operation 1B18) that the hidden buffer payload 1A16 had not been altered in the transmission.

Figure 1C:
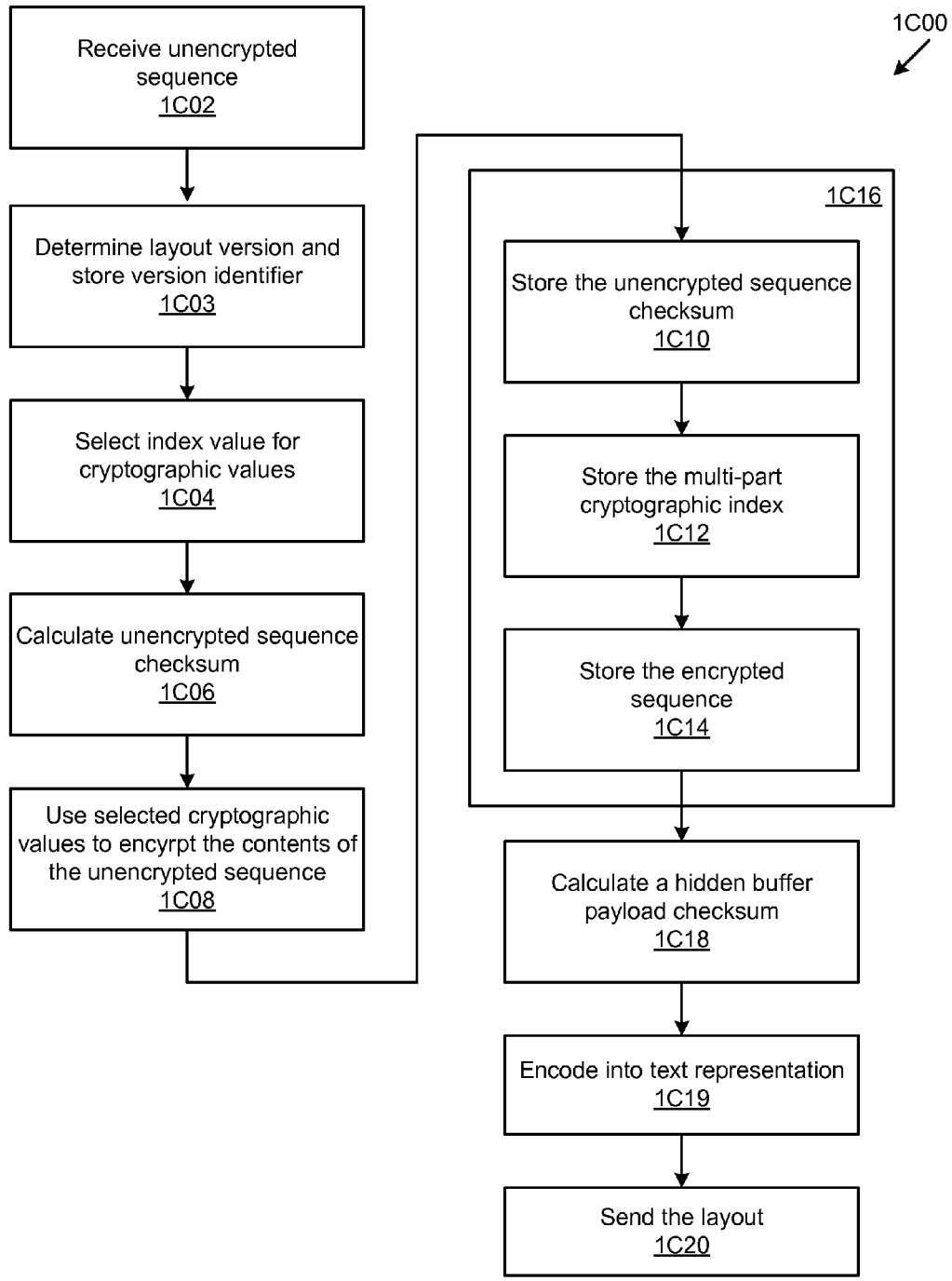
FIG. 1C is a sequence chart showing a data structure construction sequence for using formatting, checksums, and encryption to detect tampering of a data buffer, according to some embodiments.

FIG. 1C is a sequence chart showing a data structure construction sequence 1C00 for using formatting, checksums, and encryption to detect tampering of a data buffer. As an option, the present data structure construction sequence 1C00 may be implemented in the context of the architecture and functionality of the embodiments described herein. Also, the data structure construction sequence 1C00 used in a system or any aspect therein may be implemented in any desired environment.

As shown, the data structure construction sequence 1C00 receives unencrypted data (see operation 1C02). An enterprise application then determines the data structure layout version to use and stores an associated value of a layout version identifier 1A18 in a range of memory addresses (see operation 1C03). Then, the enterprise application selects (e.g., randomly or in a cyclical pattern, or in an acyclical pattern) an index value (e.g., the multi-part cryptographic index 1A12) to access at least one array of encryption values (e.g., a key value, an initial value, an XOR value, etc.) to use within an encryption method 1A22 (see operation 1C04). Prior to encryption, a checksum of the unencrypted data is calculated (see operation 1C06). Having used the selected cryptographic index value, and the corresponding needed encryption values to use within an encryption method, the data structure construction sequence 1C00 serves to encrypt the unencrypted data (see operation 1C08).

The constituent components of a hidden buffer payload 1A16 can be stored in a layout, and an operation 1C16 can be defined to store the unencrypted sequence checksum (see operation 1C10), store the multi-part cryptographic index (see operation 1C12) and store the encrypted sequence (see operation 1C14). The order of performance of operation 1C10, operation 1C12, and operation 1C14 can be changed from the specific embodiment as given by operation 1C16.

The layout is then populated with a hidden buffer payload checksum 1A11 (see operation 1C18), the hidden buffer payload is encoded into text representation (see operation 1C19), and the entire layout can be sent or stored (see operation 1C20).

Figure 1D:
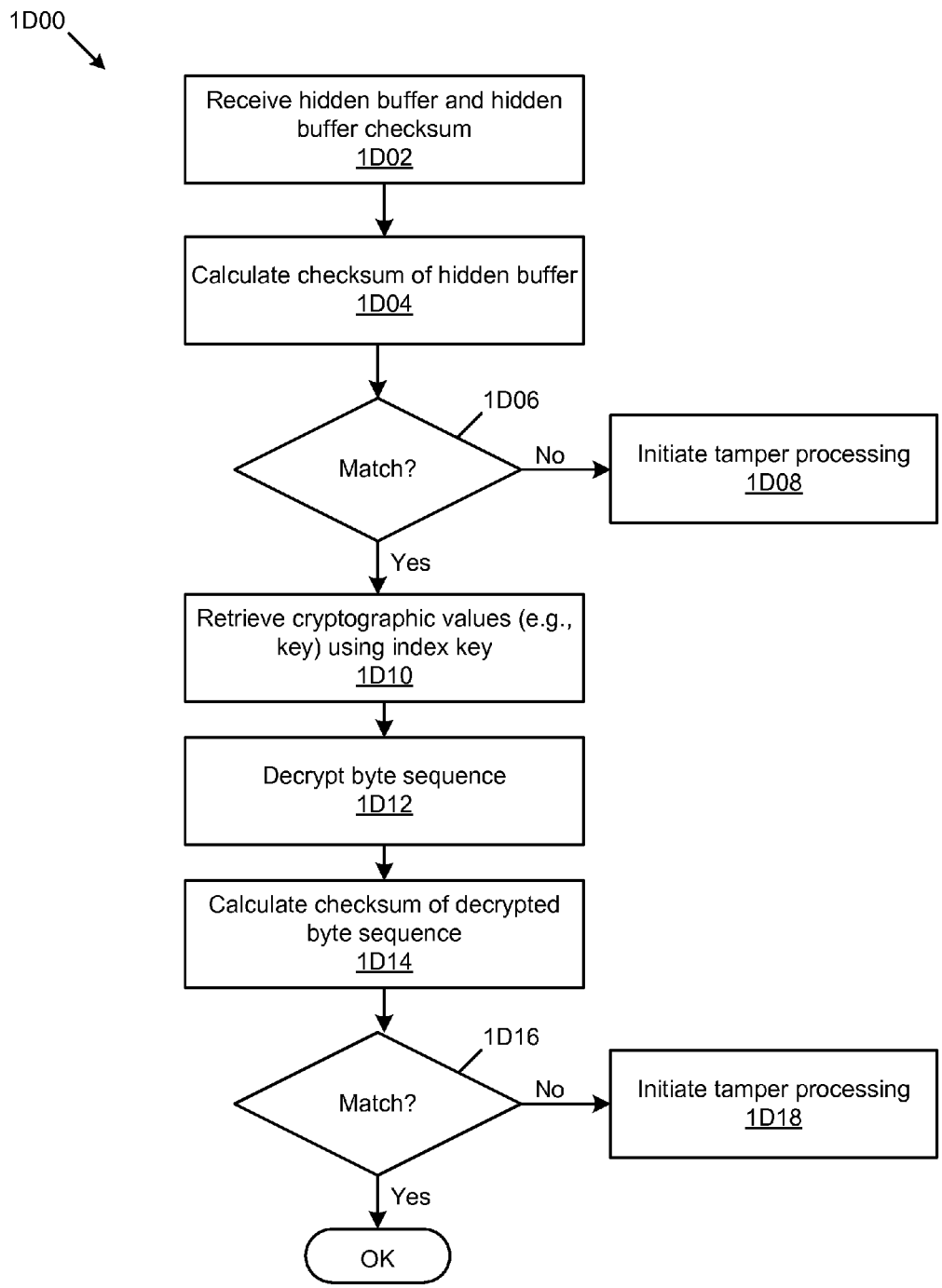
FIG. 1D is a chart showing a tamper detection technique for using formatting, checksums, and encryption to detect tampering of a data buffer, according to some embodiments.

FIG. 1D is a chart showing a tamper detection technique 1D00 for using formatting, checksums, and encryption to detect tampering of a data buffer. As an option, the present tamper detection technique 1D00 may be implemented in the context of the architecture and functionality of the embodiments described herein. Also, the tamper detection technique 1D00 used in a system or any aspect therein may be implemented in any desired environment.

As shown, the tamper detection technique 1D00 commences when a hidden buffer payload and a hidden buffer payload checksum is received (see operation 1D02). A particular checksum calculation is performed on the hidden buffer payload (see operation 1D04), and the calculated hidden buffer payload checksum is compared to the received hidden buffer payload checksum to determine a match (see decision 1D06) or a mis-match.

When such a mis-match is found, some form of corruption or tampering is deemed to have occurred, and the tamper detection technique 1D00 initiates tamper processing 1D08.

In exemplary cases, in addition to receiving the received hidden buffer payload, a layout version identifier is also received (not shown in FIG. 1D) and, using the layout version identifier, the aforementioned particular checksum calculation is determined based on the value of the layout version identifier 1A18.

In further exemplary cases, a particular cryptographic technique can be determined based on the layout version identifier. As earlier described, using the multi-part cryptographic index, a particular cryptographic technique can be determined and, given a determined particular cryptographic technique, the first portion of the multi-part cryptographic index can be used to retrieve a first particular cryptographic value (e.g., a key value), and the second portion of the multi-part cryptographic index can be used to retrieve a second particular cryptographic value (e.g., an XOR value). In this manner, sufficient cryptographic values can be determined (see operation 1D10), and the sequence can be decrypted (see operation 1D12). In some cases, the decrypted sequence can be a decrypted text string that has been encoded. When the decrypted text string has been determined to have been encoded using a particular encoding technique, the decrypted sequence can be decoded to form an unencrypted sequence.

An additional measure of confidence that the received hidden buffer payload has not been tampered with comes via a second checksum calculation and comparison. Specifically, a checksum of the decrypted sequence is calculated (see operation 1D14), and the calculated value is compared with the received instance of an unencrypted sequence 1A13. Such a comparison confirms a match (see decision 1D16) and tamper detection technique 1D00 ends. When a match is not confirmed, some form of corruption or tampering is deemed to have occurred and the tamper detection technique 1D00 initiates steps for tamper processing 1D18.

Figure 2A:
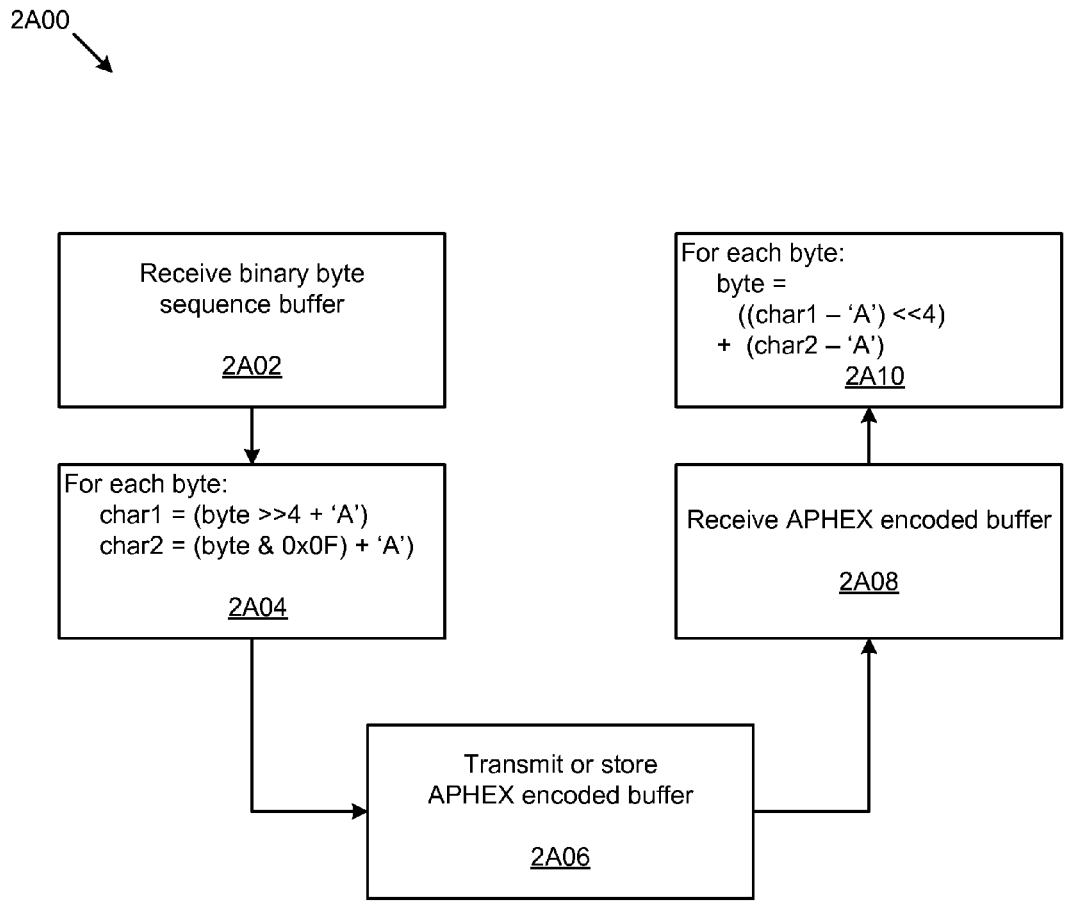
FIG. 2A is a sequence chart showing a technique for encoding and decoding a binary buffer using a text representation, according to some embodiments.

FIG. 2A is a sequence chart showing a technique for encoding and decoding a binary buffer using a text representation. As an option, the present buffer encoding technique 2A00 may be implemented in the context of the architecture and functionality of the embodiments described herein. Also, the buffer encoding technique 2A00 used in a system or any aspect therein may be implemented in any desired environment.

Aspects of FIG. 2A can be used in the context of the embodiments disclosed herein, and/or can be used in any other context. Text nodes can be represented as binary byte arrays, and binary byte arrays can be represented as text strings. A string representation is convenient when the binary values are to be printed or passed around (e.g., passed around in cases where text is allowed but not allowed to be passed around in binary representations such as in email and in XML text strings). Standard hexadecimal representations transform the binary sequence into base 16 numbers, which are the represented with characters 0 to 9 and A to F. However, advances using APHEX are described below. Specifically, the APHEX representation relies on a method to encode binary values into text strings. The representation and use supports extremely fast conversions, due in part to its simplicity of implementation on a computer.

APHEX uses the set of characters {A-P}, while standard hexadecimal uses the set {0-9,A-F,a-f}. In order to convert standard hexadecimal text into binary values, a conversion routine implements the complexities of functions calls, "if-else" statements, or look-up tables. That is because the text characters are not contiguous. However, the APHEX conversions can use simple arithmetic because all text characters are contiguous, as is shown in the APHEX encoding technique 2A00 of FIG. 2A.

To encode to text from binary:

```
char1 = (byte >> 4) + 'A';
char2 = (byte & 0x0F) + 'A';
```

To decode to binary from text:

```
byte=((char1-'A')<<4)+(char2-'A');
```

As an example, for byte=1, standard hex converts to "01", while APHEX converts to "AB". The contiguous character set feature is found when using ASCII, UTF8, and UTF16 characters. The APHEX representation can be used on EBCDIC machines by using one of the UTF character sets.

Conversions into APHEX representations can be implemented in a method. For example, and as shown in FIG. 2A, such a method commences upon receipt of a buffer (e.g., a binary byte sequence buffer) such as is mentioned in operation 2A02. Then, in this embodiment, for each byte, the upper nibble and the lower nibble are converted into a text character in the range 'A' through 'P' (see operation 2A04). The resulting encoded buffer is all 'text', and can then be transmitted in contexts where binary data is disallowed such as in email transmissions (see operation 2A06).

Conversions from APHEX representations can be implemented in a method. For example, and as shown in FIG. 2A, such a method to convert from an APHEX representation commences upon receipt of a buffer such as is mentioned in operation 2A08. Then, in this embodiment, for each byte, the upper nibble and the lower nibble are converted into a binary value corresponding values in the range '0000' through '1111' (see operation 2A10).

Exemplary usage of this technique includes uses where text is required instead of binary data, and where extremely fast conversions are required between the binary and text representations.

FIG. 2B are runtime performance comparisons 2B00 for methods of encoding and decoding binary buffers into a text representation. As an option, the present runtime performance comparisons 2B00 may be implemented in the context of the architecture and functionality of the embodiments described herein. Also, the runtime performance comparisons 2B00 of an APHEX encoding technique used in a system or any aspect therein may be implemented in any desired environment.

The comparisons of FIG. 2B illustrates performance measurements of an APHEX encoding technique, according to some embodiments. Aspects of FIG. 2B can be used in the context of the embodiments disclosed herein, and/or can be used in any other context. As shown, the performance of APHEX encoding compares favorably against alternative encoding techniques.

Figure 3:
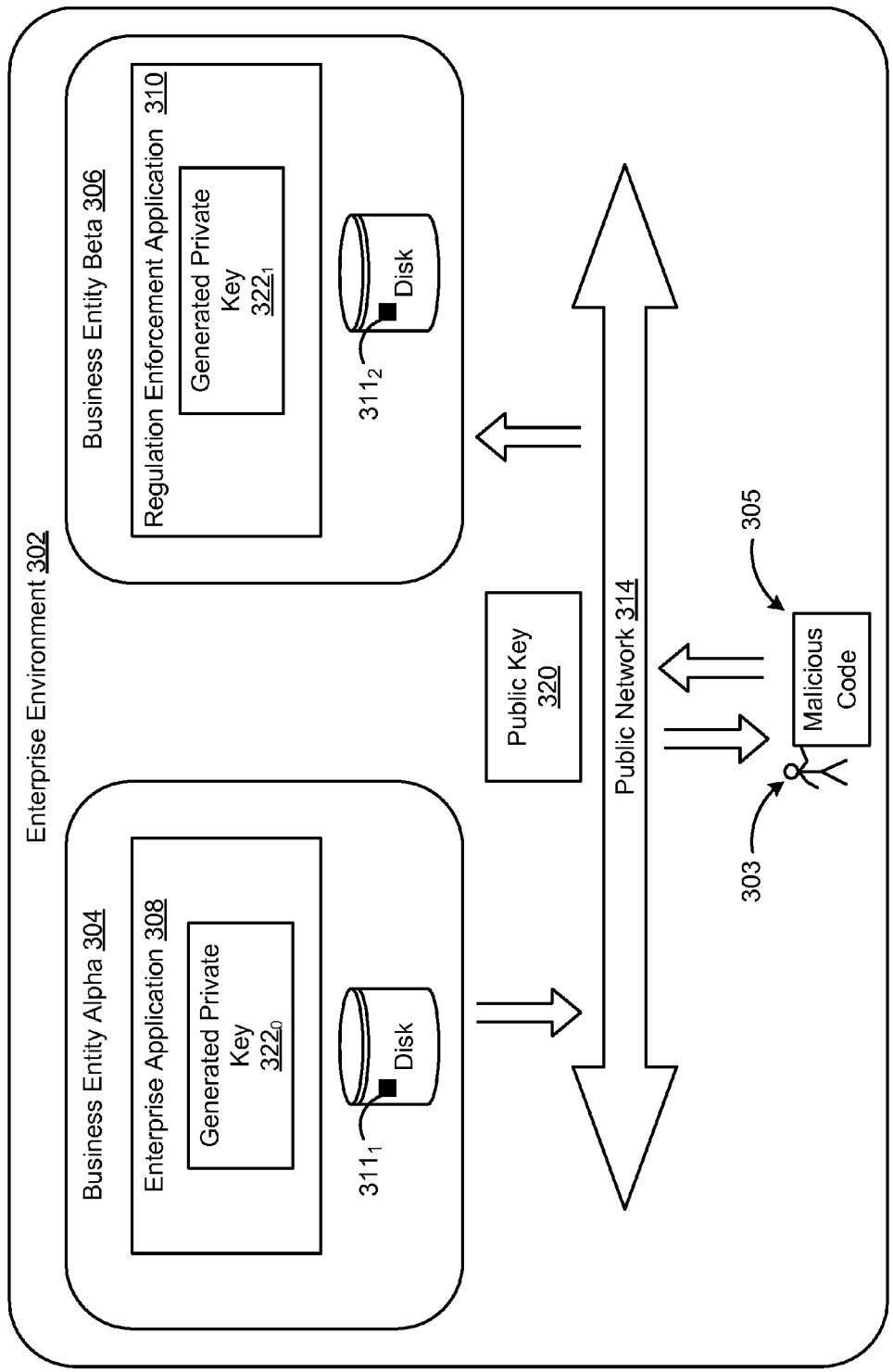
FIG. 3 shows an enterprise environment having inter-operating enterprise applications for using formatting, checksums, and encryption to detect tampering of a data buffer, according to some embodiments.

FIG. 3 shows an enterprise environment having inter-operating enterprise applications for using formatting, checksums, and encryption to detect tampering of a data buffer. As an option, the present inter-operating enterprise applications may be implemented in the context of the architecture and functionality of the embodiments described herein. Also, the inter-operating enterprise applications used in a system or any aspect therein may be implemented in any desired environment.

In the enterprise environment 302 as shown, a business entity 304 communicates with a business entity 306 using a public network 314. In exemplary cases, a business entity 304 uses an enterprise application 308 to perform business operations. And in some cases the performance of business operations includes communications of commercial transaction data with an enforcement organization, which in turn might use a regulation enforcement application 310. Further, the communication of commercial transaction data between the business entity 306 and an enforcement organization should be secure. Accordingly, a distribution image 311 stored on a non-volatile medium (e.g., a CDROM, or DVD, or a disk drive, etc.) is used by each organization, and program code stored in each copy of a distribution image (e.g., distribution image $311_1$, or distribution image $311_2$) can be used to generate a private key. Having a generated private key 322 (e.g., generated private key $322_0$, generated private key $322_1$) and a public key 320, the contents of communication is protected against observation and/or changes by a malicious agent 303, or by malicious code 305.

In a specific usage, the business entity 306 might be a government tax agency that requires invoices to be digitally signed. In such a case, a secure digital signature can be implemented using a generated a public key and a generated private key in a pair (e.g., using known techniques).

The public key 320 is sent by business entity 304, to the government tax agency (or otherwise made accessible to the government tax agency). The public key is used in combination with the generated private key (e.g., generated private key $322_0$ as sent, and generated private key $322_1$ as received) to verify an invoice. If the digitally-signed invoice had been tampered with between the time of the digital signing, and the government tax agency's receipt of the invoice, then the digital signature will be incorrect—and will be recognizable as having been tampered with (or otherwise corrupted). In exemplary use models, the private key is stored as text in the herein-described hidden buffer format, and the (hidden) private key is used to generate the digital signatures on invoices. In accordance with this use model, the private key is intended to remain unknown to the users of the digital-signing software. If the private key becomes compromised, then a new public/private key pair, is generated, and the newly-generated public key is registered with the tax agency and used for future invoices. The newly-generated private key would be sent (e.g., in hidden buffer text format) to business entities who use the digital-signing software.

Figure 4A:
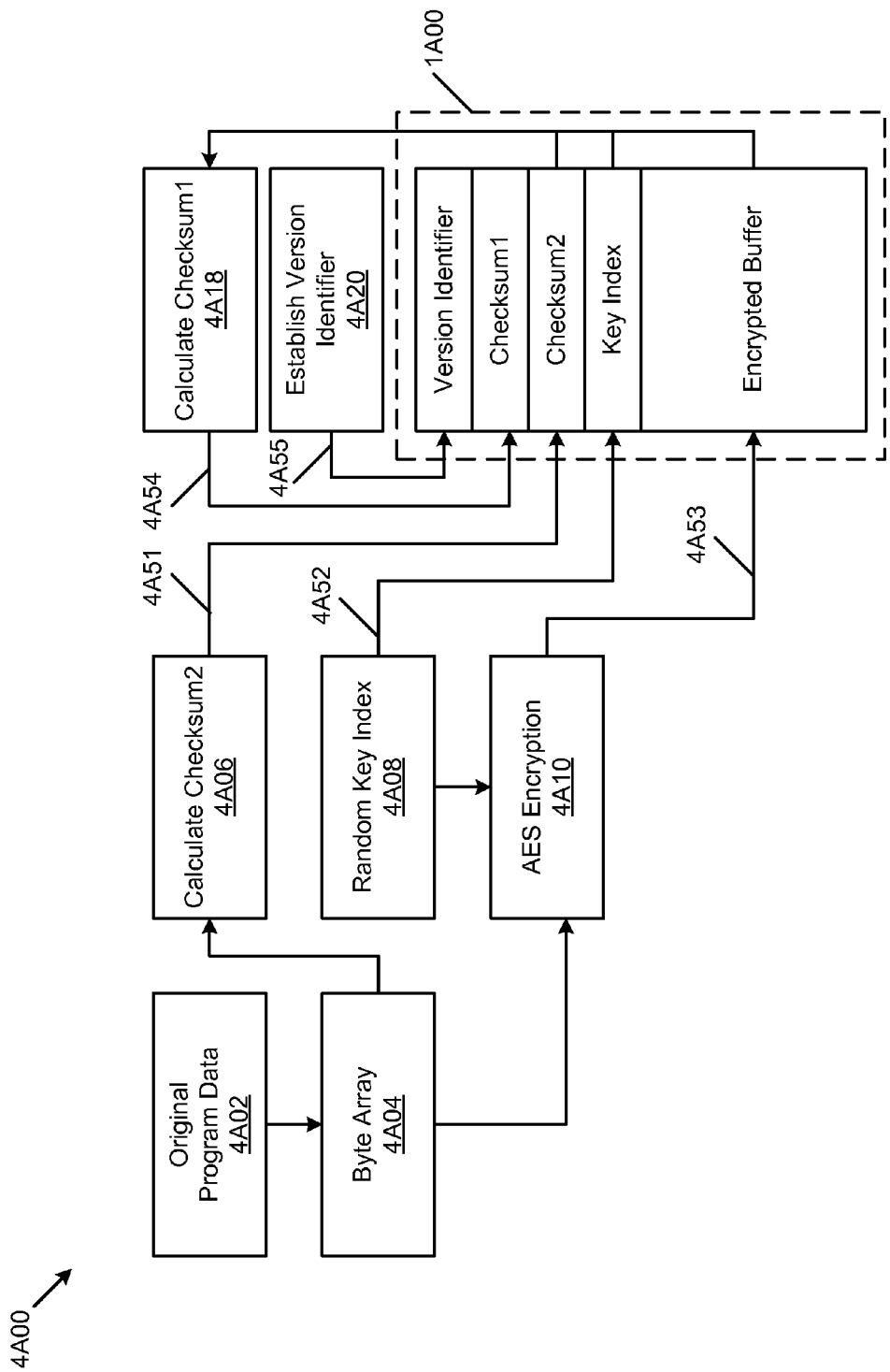
FIG. 4A is a diagram of a flow of construction operations for using formatting, checksums, and encryption to detect tampering of a data buffer, according to some embodiments.

FIG. 4A is a diagram of a flow of construction operations 4A00 for using formatting, checksums, and encryption to detect tampering of a data buffer. As an option, the present construction operations 4A00 may be implemented in the context of the architecture and functionality of the embodiments described herein. Also, the construction operations 4A00 used in a system or any aspect therein may be implemented in any desired environment.

Aspects of FIG. 4A can be used in the context of the embodiments disclosed herein, and/or can be used in any other context. As earlier indicated, when a value or collection of values (e.g., a string, an XML data structure, etc.) needs to be passed around (and/or stored in volatile or non-volatile memory), the passing techniques hereinabove allows the passed-around values to read by users, but without those users being aware of the actual value since, using the techniques herein, the collection of values are encrypted into an encrypted sequence. The encrypted sequence can be turned into text string by using (for example) base-64 encoding. In some embodiments—specifically when a collection of values is encoded as a terminated text string—the length of the entire collection of values is determined by the terminator of the text string.

Exemplary flows are described above, however the order of the performance of operations in the exemplary flows as described above can be changed, so long as certain data dependencies are observed. Several such data dependencies are depicted by the flow of construction operations 4A00 for using formatting, checksums, and encryption to detect tampering of a data buffer, as given in FIG. 4A.

As shown, a program (e.g., enterprise application 308) might comprise several modules, and one or more modules might be programmed to send sensitive or regulated data to another program (e.g., regulation enforcement application 310) over a public network. In this embodiment, a collection of values (e.g., original program data 4A02) can be formed into a byte array 4A04. The value of Checksum2 can be calculated (see operation 4A06) and saved (see store operation 4A51). The collection of values is to be encrypted, so a key (e.g., an AES key) is selected. The key can be selected directly, or other obfuscating techniques can be used (as shown) to select a particular key from an array of possible keys (see operation 4A08), and (as shown) the index to select a particular key from an array of possible keys is stored (see store operation 4A52). Now, using the selected particular key from an array of possible keys, the byte array 4A04 is encrypted (e.g., using AES encryption 4A10), and then stored (see store operation 4A53). The encrypted buffer (e.g., an instance of an encrypted sequence 1A14) and the index (e.g., an instance of a multi-part cryptographic index 1A12) and the Checksum2 (e.g., an instance of an unencrypted sequence checksum 1A10) are combined to form a hidden buffer payload. Still further, a checksum, namely Checksum1, is calculated (see operation 4A18) using the hidden buffer payload and stored (see store operation 4A54). In some embodiments, the particular layout selected, the particular encryption techniques, and the checksum techniques can be determined based on a version identifier. Accordingly, a version identifier (e.g., layout version identifier 1A18) is determined (see operation 4A20) and stored (see store operation 4A55).

Figure 4B:
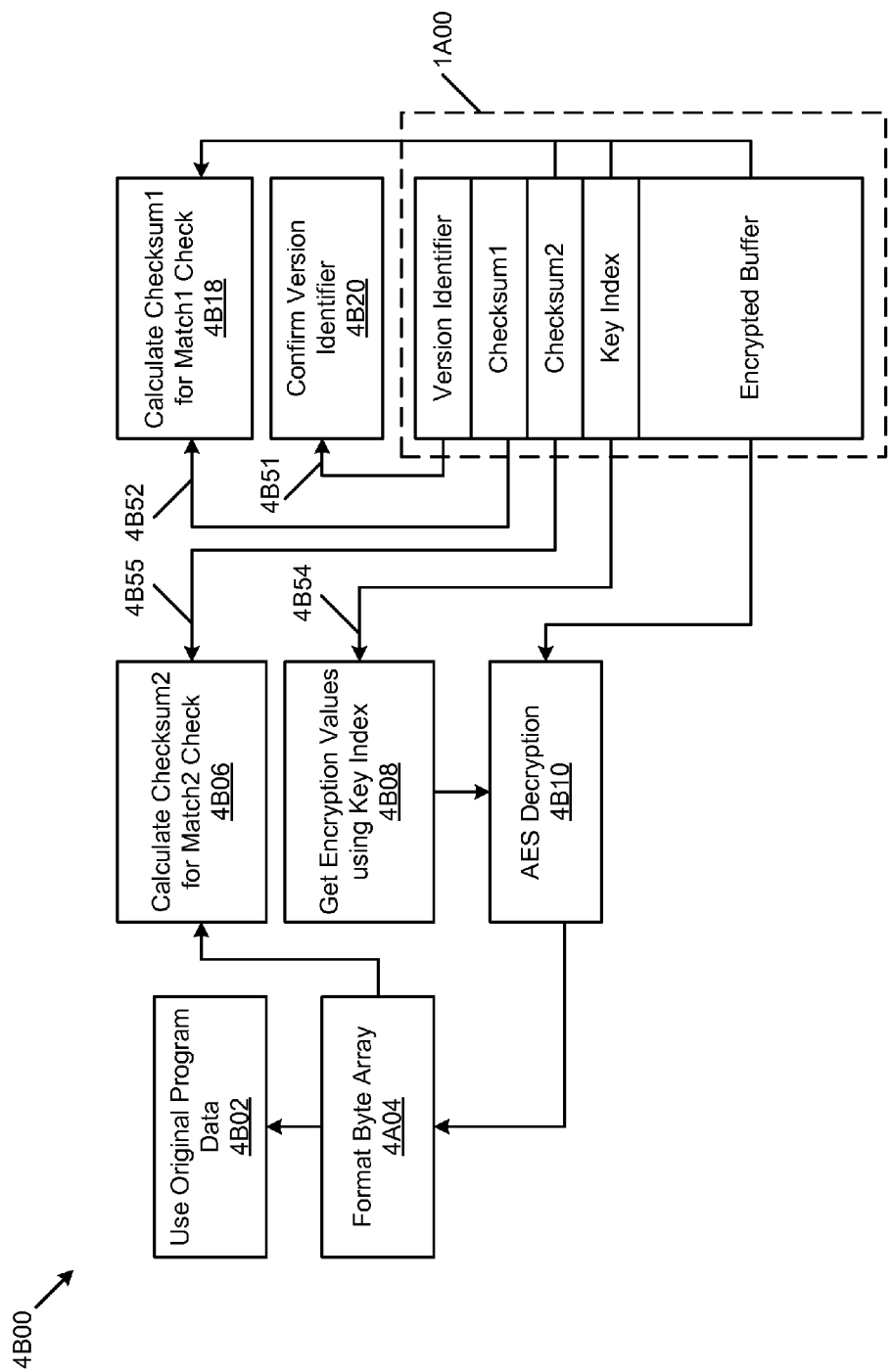
FIG. 4B is a diagram of a flow of deconstruction operations for using formatting, checksums, and encryption to detect tampering of a data buffer, according to some embodiments.

FIG. 4B is a diagram of a flow of deconstruction operations 4B00 for using formatting, checksums, and encryption to detect tampering of a data buffer. As an option, the present deconstruction operations 4B00 may be implemented in the context of the architecture and functionality of the embodiments described herein. Also, the deconstruction operations 4B00 used in a system or any aspect therein may be implemented in any desired environment.

Aspects of FIG. 4B can be used in the context of the embodiments disclosed herein, and/or can be used in any other context. As earlier indicated, when a value or collection of values (e.g., a string, an XML data structure, etc.) needs to be passed around, the passing techniques hereinabove allows the passed-around value to read by users, but without those users being aware of the actual value since, using the techniques herein, the collection of values are encrypted into an encrypted sequence, then passed to a receiver (e.g., to a regulation enforcement application 310) over a network (e.g., a public network 314). The encrypted sequence can be received, and a flow of deconstruction operations 4B00 can be followed to receive the value or collection of values in its original form (e.g., in the form of the original program data 4A02).

As shown, a data structure layout 1A00 is received. As a possible initial step in the flow of deconstruction operations 4B00, the version identifier can be extracted (see extract operation 4B51) and confirmed (see operation 4B20), and having confirmed the version identifier, further particulars regarding the structure and content of the data structure layout 1A00 is known. For example, a particular algorithm to extract (see extract operation 4B52) and calculate Checksum1 can be identified, and that particular algorithm can be used in a checksum calculation (see operation 4B18). As earlier indicated, the algorithm to calculate Checksum1 is applied to the hidden buffer payload, and the result of said calculation is compared to the value of Checksum1 as found in the received data structure layout and in doing so the receiver can verify that the data structure layout is not corrupted. More particularly, an operation to extract (see extract operation 4B52) and calculate Checksum1 for a match (see operation 4B18) results in a match (e.g., Match1, as shown). The determination to initiate tamper processing can be made on the basis of Match1 (also see decision 1D06 of FIG. 1D). In this embodiment, processing continues by extracting the key index (see extract operation 4B54) from the data structure layout 1A00 and, in turn, the encryption values (e.g., a key value, an initial value, an XOR value, etc.) to use within an encryption method are retrieved based on the value of the key index (see operation 4B08). As is described herein, the key index can be formatted as a multi-part cryptographic index, where the multi-part cryptographic index comprises a first portion being an index to a first cryptographic value (e.g., a key value) and another portion being an index to a second cryptographic value to be used in a decryption operation. For example, and in the case of version identifier being associated with AES, and further, having the needed cryptographic values, the encrypted buffer can be decrypted (see operation 4B10) resulting in (as shown) a byte array 4A04, which byte array is subjected to a further checksum calculation to extract (see extract operation 4B55) and then calculate and compare to determine Match2 (see operation 4B06) in order to confirm the integrity of the original program data, which can be used by the receiver (see operation 4B02).

Obfuscated Keys

Figure 5:
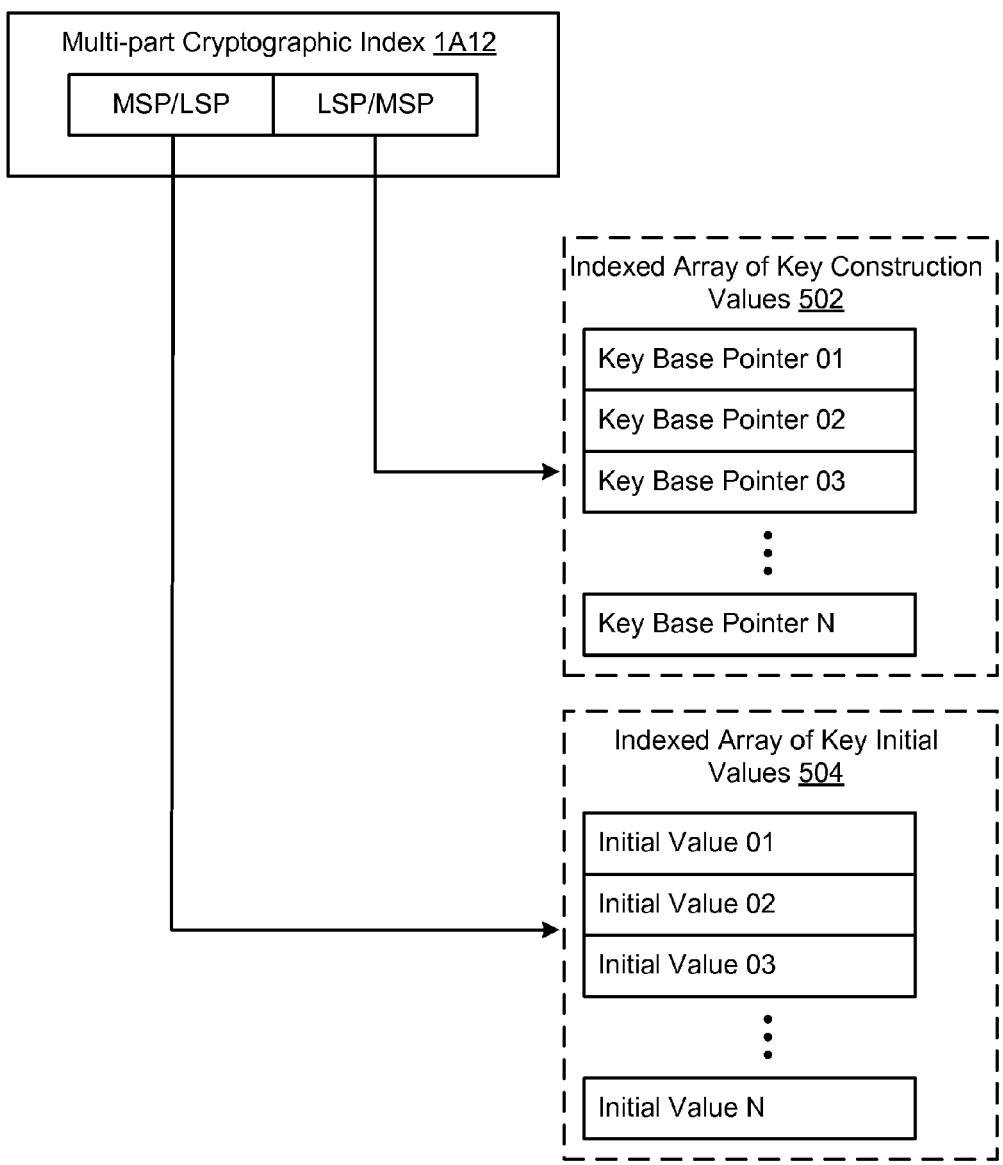
FIG. 5 is a diagram of interrelated data structures supporting obfuscated keys for increasing authentication and data security in enterprise applications, according to some embodiments.

FIG. 5 is a diagram of interrelated data structures 500 supporting obfuscated keys for increasing authentication and data security in enterprise applications. As an option, the present obfuscated keys may be implemented in the context of the architecture and functionality of the embodiments described herein. Also, the obfuscated keys used in a system or any aspect therein may be implemented in any desired environment.

As indicated above, a multi-part cryptographic index 1A12 can be formatted as a single byte, or can be formatted as a word of any length. For example, a multi-part cryptographic index 1A12 can be formatted as a word value (as shown) comprising a most significant part (MSP) and a least significant part (LSP), and the MSP and LSP can be stored in any order within the word value. A multi-part cryptographic index 1A12 can comprise a first portion to hold an index into a first array, and a second portion to hold an index into a second array. Or, a multi-part cryptographic index 1A12 can be used in any arbitrary assembly pattern as may be applicable to a particular encryption method. Further, the first array can be an indexed array of key construction values 502 and the second array can be an indexed array of key initial values 504.

Figure 6:
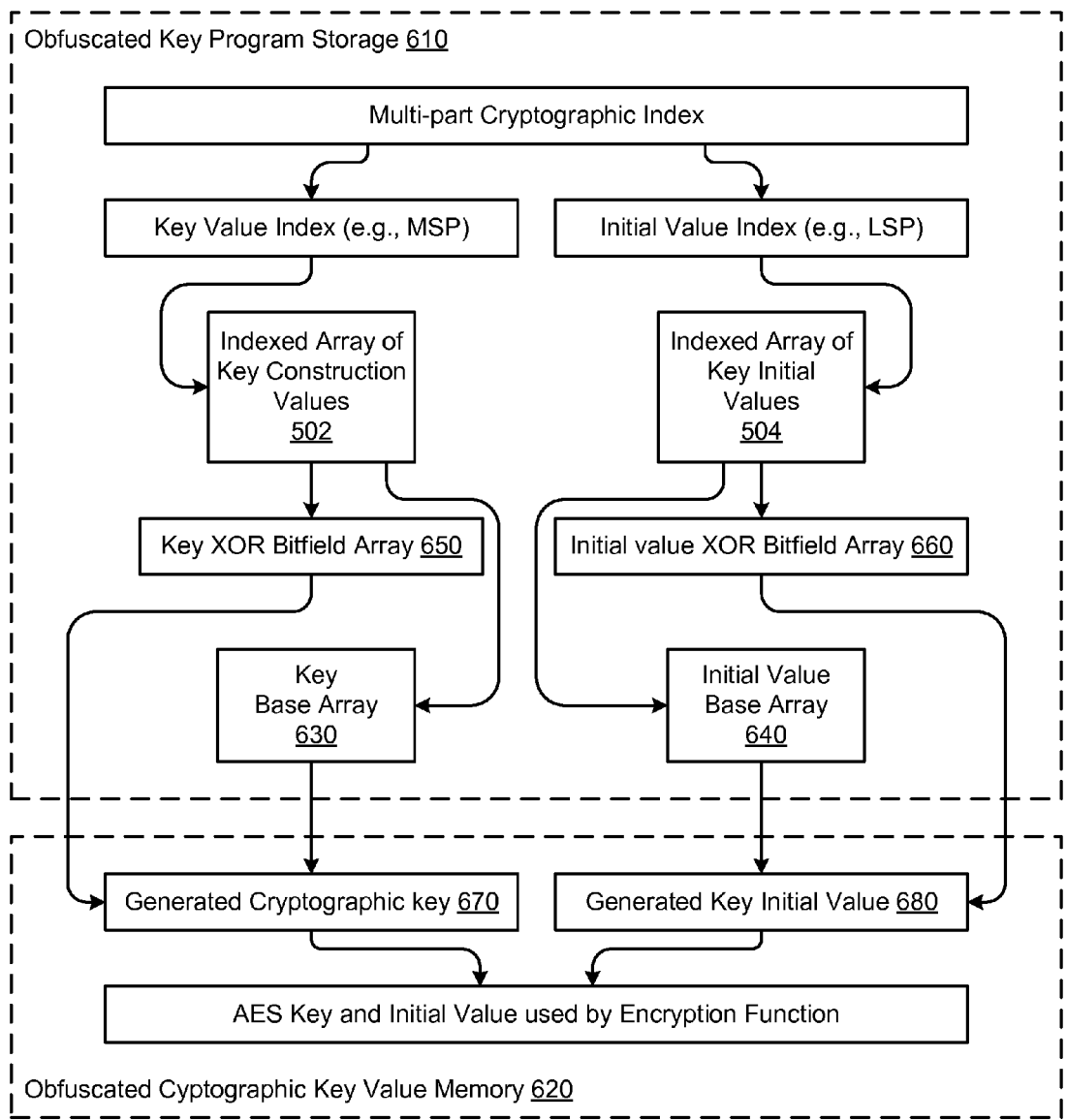
FIG. 6 shows specific sizes of data structures and pointers for obfuscated keys for increasing authentication and data security in enterprise applications, according to some embodiments.

FIG. 6 shows specific sizes of data structures and pointers for obfuscated keys for increasing authentication and data security in enterprise applications. As an option, the present obfuscated keys may be implemented in the context of the architecture and functionality of the embodiments described herein. Also, the obfuscated keys used in a system or any aspect therein may be implemented in any desired environment.

FIG. 6 illustrates an access technique for data structures, according to some embodiments. Aspects of FIG. 6 can be used in the context of the embodiments disclosed herein, and/or can be used in any other context. Enterprise software applications are frequently distributed by storing the program code (and related data) for the enterprise software application in a distribution image stored on a non-volatile medium (e.g., a CDROM, or DVD, or a disk drive, etc.). In legacy environments, the actual key values and actual initial values used for encryption (and for decryption in symmetric-key algorithms) were stored as hard-coded values in the program source code, and in some cases the actual key values used for encryption were stored in the stored program code. Following legacy techniques, such stored values can be discovered by scanning the program or library binary code. In environments where there are malicious agents, key obfuscating techniques are desired.

As shown in FIG. 6, encryption key values are obfuscated by storing key indexes rather than the actual key values. That is, the actual key values are not stored in a program (where they could be compromised by a search of the binary of the library). The program stores random-looking arrays for keys, initial values, and other values (e.g., any of a range of XOR values) used for an encryption algorithm. At runtime, an enterprise software program uses a passed-in key index to generate the actual key and uses a passed-in initial value index to generate initial values from the stored arrays. Following the techniques of some ciphers, a conversion (e.g., an encryption of an unencrypted sequence, or a decryption of an encrypted sequence) is performed using a byte-by-byte generation of the actual key values using the stored base values and the stored XOR values. The operation for generating keys (and initial values) is very fast computationally. In exemplary embodiments, the keys only exist in memory during the encryption and decryption processes—they are not stored in the stored program code of the enterprise software application. Thus, if a key index becomes known by hackers, the actual key cannot be determined. One possible usage of this technique is to store cryptographic values (e.g., key values indexes) to be used in a program, without storing the actual key values, which is often deemed as a more secure technique. Using this technique serves for implementing a computer-implemented method for generating obfuscated cryptographic key values within an enterprise software application. Such a method commences by storing (e.g., in a distribution image 311 of the enterprise software application) an indexed array of key construction values 502 and an indexed array of key initial values 504, then the enterprise software application receives a multi-part cryptographic index 1A12 to index into the indexed array of key construction values and to index into the indexed array of key initial values 504. Having the multi-part cryptographic index, then retrieving a key XOR bitfield array 650 by indexing into the indexed array of key construction values using a first portion of the multi-part cryptographic index, and retrieving a initial value XOR bitfield array 660 by indexing into the indexed array of key initial values using a second portion of the multi-part cryptographic index. The key XOR bitfield array can be used in conjunction with a key base array 630 to implement a cryptographic algorithm for generating a cryptographic key. In similar fashion, the initial value XOR bitfield array can be used in conjunction with an initial value base array 640 to implement a cryptographic algorithm for generating an initial value. As shown and described, although the obfuscated key program storage 610 serves to store some of the cryptographic data items, the generated cryptographic key 670 is not stored in the distribution image; instead (and as shown), the generated cryptographic key 670 is generated within the obfuscated cryptographic key value memory 620, and is not stored in the distribution image. Similarly, the generated key initial value 680 is not stored in the distribution image; instead (and as shown), the generated key initial value 680 is generated within the obfuscated cryptographic key value memory 620, and is not stored in the distribution image.

Additional Embodiments of the Disclosure

Figure 7:
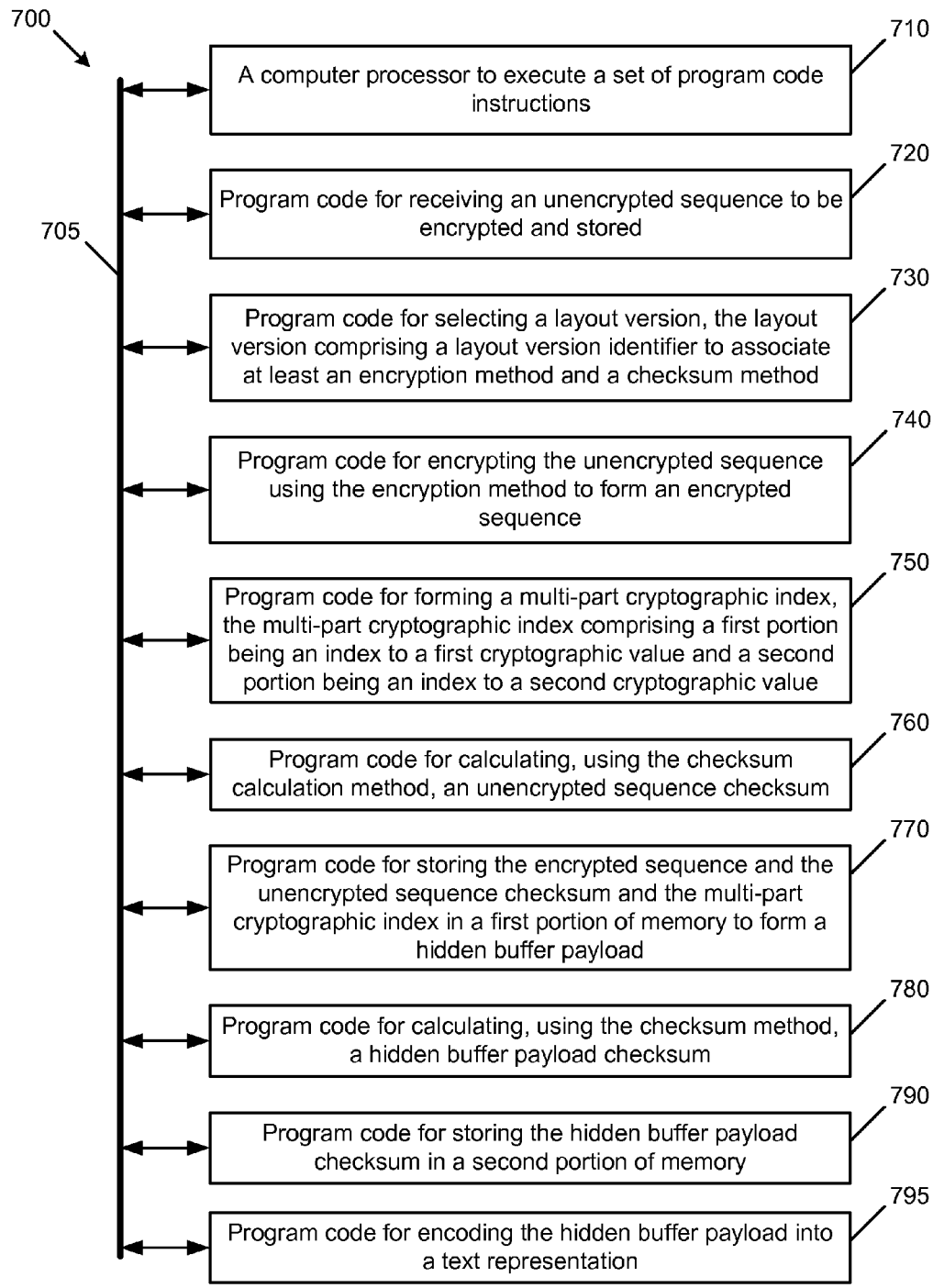
FIG. 7 depicts a block diagram of a system to perform certain functions of a computer system for increasing authentication and data security in enterprise applications, according to some embodiments.

FIG. 7 depicts a block diagram of a system to perform certain functions of a computer system. As an option, the present system 700 may be implemented in the context of the architecture and functionality of the embodiments described herein. Of course, however, the system 700 or any operation therein may be carried out in any desired environment. As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving an unencrypted sequence to be encrypted and stored (see module 720); selecting a layout version, the layout version comprising a layout version identifier to associate at least an encryption method and a checksum method (see module 730); encrypting the unencrypted sequence using the encryption method to form an encrypted sequence (see module 740); forming a multi-part cryptographic index, the multi-part cryptographic index comprising a first portion being an index to a first cryptographic value and a second portion being an index to a second cryptographic value (see module 750); calculating, using the checksum calculation method, an unencrypted sequence checksum (see module 760); storing the encrypted sequence and the unencrypted sequence checksum and the multi-part cryptographic index in a first portion of memory to form a hidden buffer payload (see module 770); calculating, using the checksum method, a hidden buffer payload checksum (see module 780); storing the hidden buffer payload checksum in a second portion of memory (see module 790); and encoding the hidden buffer payload into a text representation (see module 795).

Figure 8:
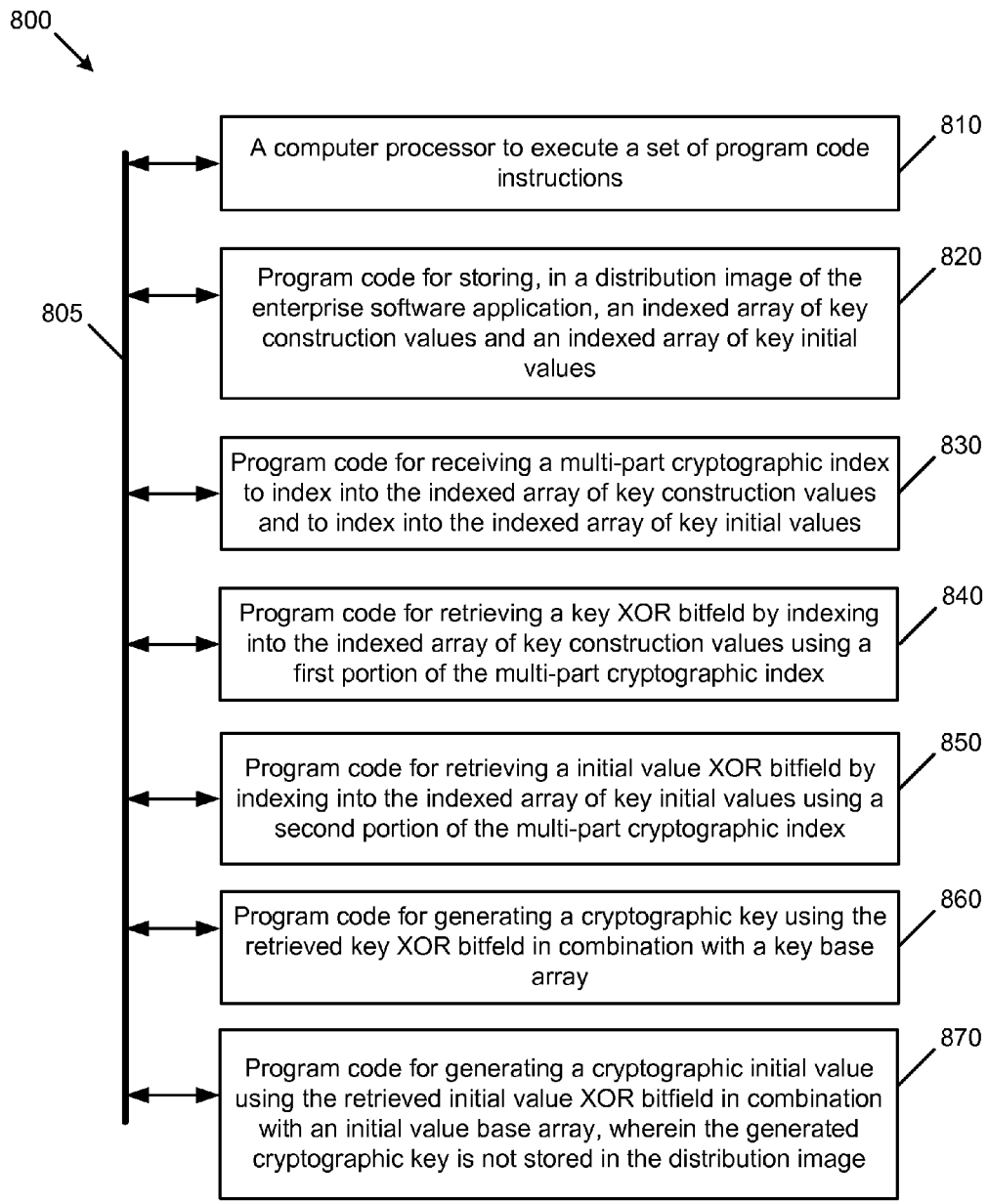
FIG. 8 depicts a block diagram of a system to perform certain functions of a computer system for increasing authentication and data security in enterprise applications, according to some embodiments.

FIG. 8 depicts a block diagram of a system to perform certain functions of a computer system. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: storing, in a distribution image of the enterprise software application, an indexed array of key construction values and an indexed array of key initial values (see module 820); receiving a multi-part cryptographic index to index into the indexed array of key construction values and to index into the indexed array of key initial values (see module 830); retrieving a key XOR bitfield array by indexing into the indexed array of key construction values using a first portion of the multi-part cryptographic index (see module 840); retrieving a initial value XOR bitfield array by indexing into the indexed array of key initial values using a second portion of the multi-part cryptographic index (see module 850); generating a cryptographic key using the retrieved key XOR bitfield array in combination with a key base array (see module 860); generating a cryptographic initial value using the retrieved initial value XOR bitfield array in combination with an initial value base array where the generated cryptographic key is not stored in the distribution image (see module 870).

System Architecture Overview

Figure 9:
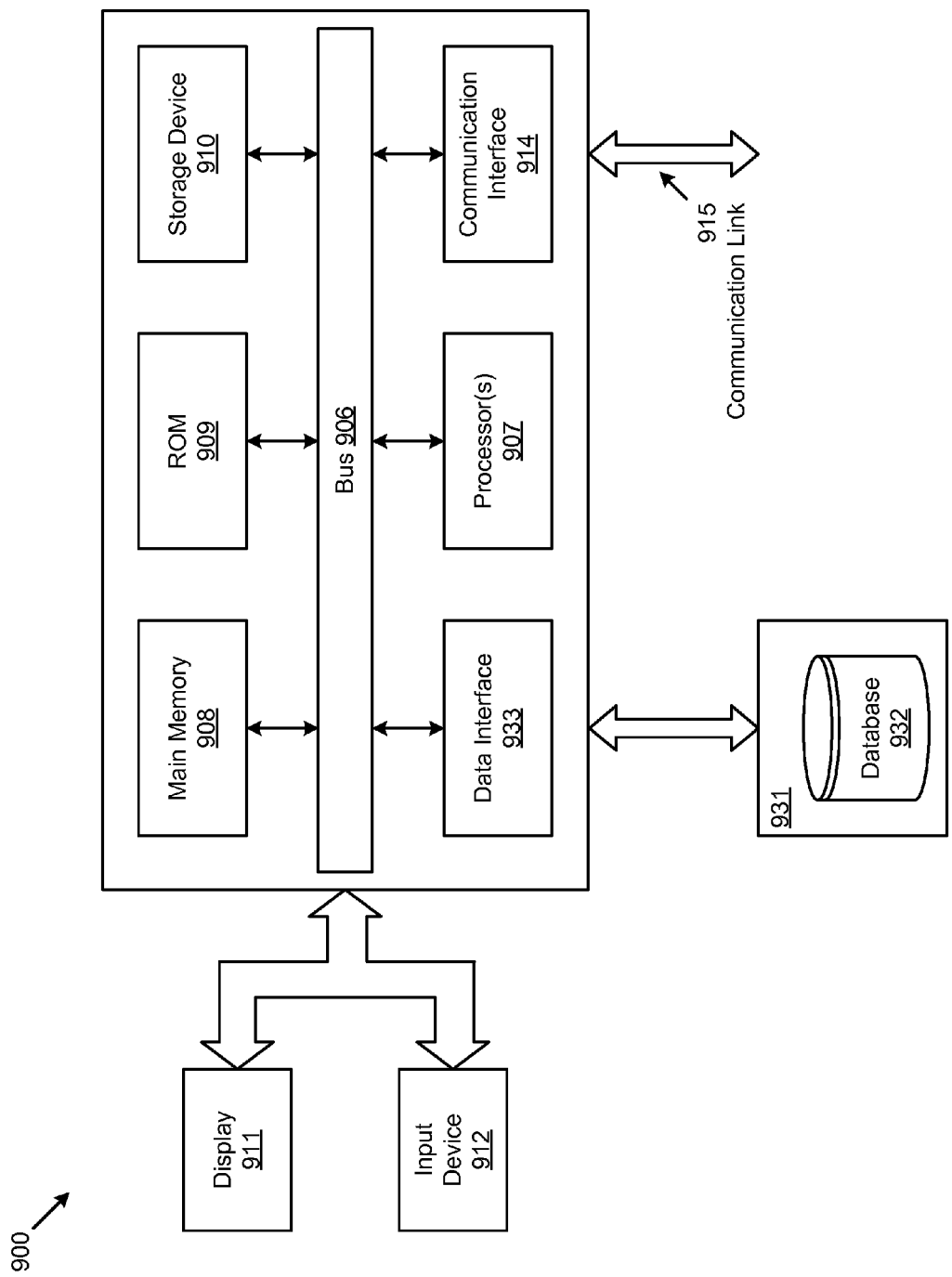
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device 909 (e.g., ROM), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device 909 or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to other embodiments of the disclosure, two or more computer systems 900 coupled by a communication link 915 (e.g., LAN, PTSN, or wireless network) may perform the sequence of instructions required to practice the disclosure in coordination with one another.

Computer system 900 may transmit and receive messages, data, and instructions, including program, i.e., application code, through communication link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for using formatting, checksums, and encryption to detect tampering of a data buffer, the method comprising:
   receiving, by a computer, an unencrypted sequence to be encrypted and stored;
   selecting a layout version, the layout version comprising a layout version identifier to associate at least an encryption method and a checksum method;
   encrypting the unencrypted sequence using the encryption method to form an encrypted sequence; and
   storing the encrypted sequence and an unencrypted sequence checksum formed by the checksum method to form a hidden buffer payload
   wherein the layout version identifier identifies a layout arrangement of the hidden buffer payload.

2. The method of claim 1, further comprising forming a multi-part cryptographic index, the multi-part cryptographic index comprising a first portion being an index to a first cryptographic value and a second portion being an index to a second cryptographic value.

3. The method of claim 1, further comprising encoding the encrypted sequence to form an encoded sequence represented as a text string.

4. The method of claim 1, further comprising storing the layout version identifier.

5. The method of claim 1, further comprising:
   receiving the hidden buffer payload;
   receiving the hidden buffer payload checksum;
   calculating, using the checksum method, a calculated hidden buffer payload checksum;
   comparing the calculated hidden buffer payload checksum to the received hidden buffer payload checksum to determine a match value; and
   initiating tamper processing when the match value indicates tampering.

6. The method of claim 1, further comprising:
   determining a particular cryptographic technique based on the layout version identifier.

7. The method of claim 1, further comprising:
   determining a particular encoding technique based on the layout version identifier.

8. The method of claim 6, wherein the particular cryptographic technique is AES.

9. The method of claim 7, wherein the particular encoding technique is APHEX.

10. A computer system for using formatting, checksums, and encryption to detect tampering of a data buffer, comprising:
    a computer processor to execute a set of program code instructions; and a memory to hold the program code instructions, in which the program code instructions comprises program code to perform, receiving an unencrypted sequence to be encrypted and stored;

selecting a layout version, the layout version comprising a layout version identifier to associate at least an encryption method and a checksum method;

encrypting the unencrypted sequence using the encryption method to form an encrypted sequence; and storing the encrypted sequence and the unencrypted sequence checksum formed by the checksum method to form a hidden buffer payload wherein the layout version identifier identifies a layout arrangement of the hidden buffer payload.

11. The computer system of claim 10, further comprising forming a multi-part cryptographic index, the multi-part cryptographic index comprising a first portion being an index to a first cryptographic value and a second portion being an index to a second cryptographic value.

12. The computer system of claim 10, further comprising encoding the encrypted sequence to form an encoded sequence represented as a text string.

13. The computer system of claim 10, further comprising:
receiving the hidden buffer payload;
receiving the hidden buffer payload checksum;
calculating, using the checksum method, a calculated hidden buffer payload checksum;
comparing the calculated hidden buffer payload checksum to the received hidden buffer payload checksum to determine a match value; and
initiating tamper processing when the match value indicates tampering.

14. The computer system of claim 10, further comprising:
determining a particular cryptographic technique based on the layout version identifier.

15. The computer system of claim 10, further comprising:
determining a particular encoding technique based on the layout version identifier.

16. A computer program product embodied in a non-transitory computer readable medium, the computer readable medium having stored thereon a sequence of instructions which, when executed by a processor causes the processor to execute a method to implement using formatting, checksums, and encryption to detect tampering of a data buffer, the method comprising:

receiving, by a computer, an unencrypted sequence to be encrypted and stored;

selecting a layout version, the layout version comprising a layout version identifier to associate at least an encryption method and a checksum method;

encrypting the unencrypted sequence using the encryption method to form an encrypted sequence; and storing the encrypted sequence and the unencrypted sequence checksum formed by the checksum method to form a hidden buffer payload wherein the layout version identifier identifies a layout arrangement of the hidden buffer payload.

17. The computer program product of claim 16, further comprising forming a multi-part cryptographic index, the multi-part cryptographic index comprising a first portion being an index to a first cryptographic value and a second portion being an index to a second cryptographic value.

18. The computer program product of claim 16, further comprising encoding the encrypted sequence to form an encoded sequence represented as a text string.

19. The computer program product of claim 16, further comprising storing the layout version identifier.

20. The computer program product of claim 16, further comprising:
receiving the hidden buffer payload;
receiving the hidden buffer payload checksum;
calculating, using the checksum method, a calculated hidden buffer payload checksum;
comparing the calculated hidden buffer payload checksum to the received hidden buffer payload checksum to determine a match value; and
initiating tamper processing when the match value indicates tampering.

21. A computer implemented method for using formatting, checksums, and encryption to detect tampering of a data buffer, the method comprising:
receiving, by a computer, the data buffer comprising at least a layout version identifier, the layout version identifier to identify the layout arrangement of a hidden buffer payload;
using the layout version identifier to associate at least a decryption method and a checksum method;
decrypting the hidden buffer payload using the decryption method to form an unencrypted sequence and a received unencrypted sequence checksum;
calculating a calculated unencrypted sequence checksum using the checksum method; and
storing the unencrypted sequence and the calculated unencrypted sequence checksum.

22. The method of claim 21, further comprising: comparing the calculated unencrypted sequence checksum to the received unencrypted sequence checksum to determine a match value; and
initiating tamper processing when the match value indicates tampering.

* * * * *

UNITED STATES PATENT AND TRADEMARK OFFICE
CERTIFICATE OF CORRECTION

| | | |
|---|---|---|
| PATENT NO. | : 8,862,897 B2 | Page 1 of 1 |
| APPLICATION NO. | : 13/459744 | |
| DATED | : October 14, 2014 | |
| INVENTOR(S) | : Pogmore | |

It is certified that error appears in the above-identified patent and that said Letters Patent is hereby corrected as shown below:

In the Drawings

In drawings, 3 of 14, in figure 1C, under Reference Numeral 1C08, line 2, delete "encyrpt" and insert -- encrypt --, therefor.

In drawings, 11 of 14, in figure 6, under Reference Numeral 620, line 1, delete "Cyptographic" and insert -- Cryptographic --, therefor.

In drawings, 13 of 14, in figure 8, under Reference Numeral 840, line 1, delete "bitfeld" and insert -- bitfield --, therefor.

In drawings, 13 of 14, in figure 8, under Reference Numeral 860, line 2, delete "bitfeld" and insert -- bitfield --, therefor.

In the Specification

In column 1, line 11, delete "entitled"DATA" and insert -- entitled "DATA --, therefor.

In column 1, line 18, delete "KEYS" ," and insert -- KEYS", --, therefor.

In column 8, line 60, delete "1Al2" and insert -- 1A12 --, therefor.

Signed and Sealed this
Twenty-eighth Day of April, 2015

Michelle K. Lee
*Director of the United States Patent and Trademark Office*